United States Patent Office 2,748,106
Patented May 29, 1956

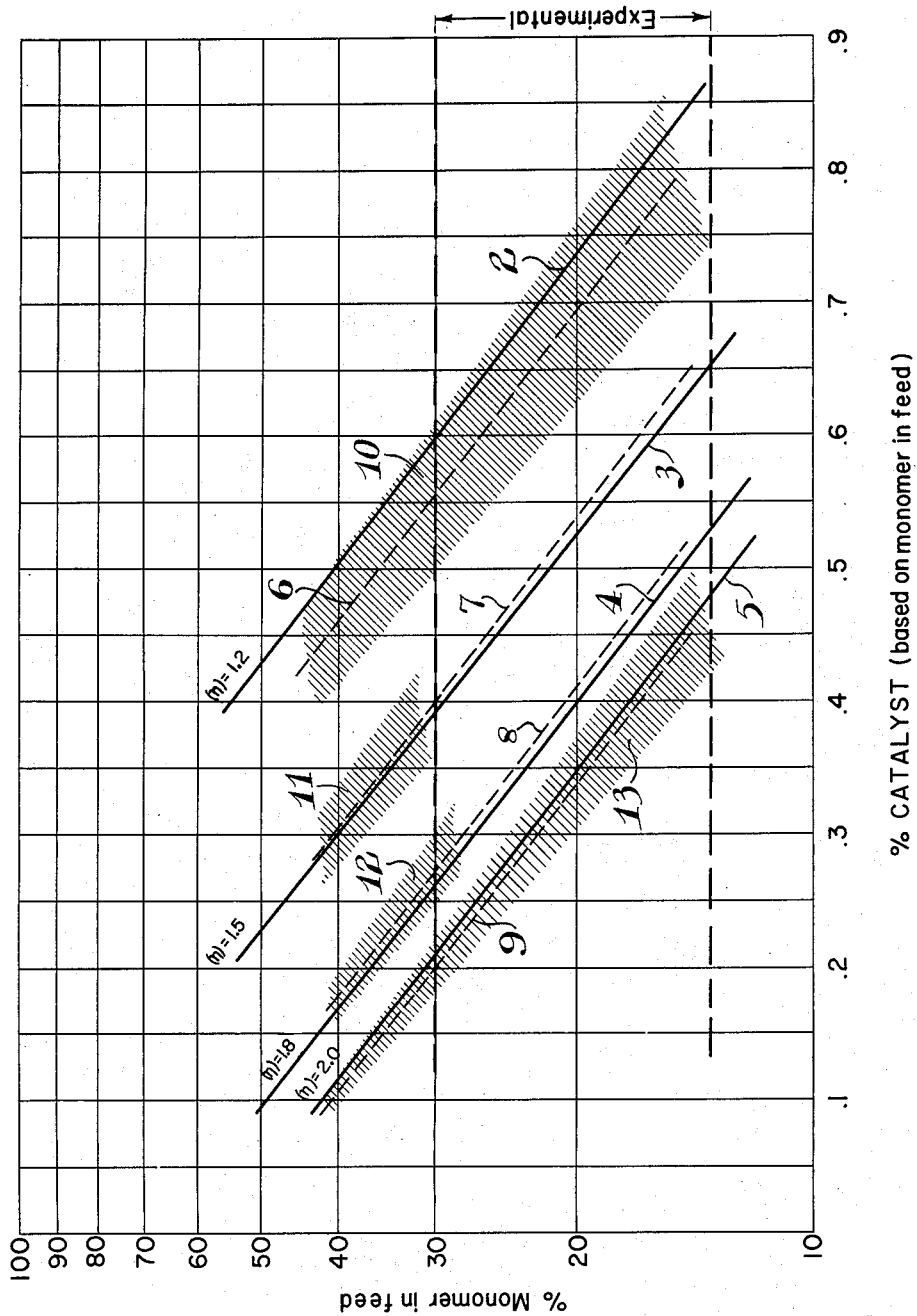

2,748,106
POLYMERIZATION

Robert Albert Scheiderbauer, Waynesboro, Va., and Leonard Stack Pitts, Bridgeport, Conn., assignors to E. I. du Pont de Nemours and Company, Wilmington, Del., a corporation of Delaware Application March 11, 1953, Serial No. 347,282
(Filed under Rule 47(a) and 35 U. S. C. 116)

6 Claims. (Cl. 260—88.7)

This invention relates to solution polymerization of acrylonitrile in a continuous polymerizing system. More particularly, it relates to increasing the conversion of acrylonitrile to polymer, either as the homopolymer or as copolymers, in such polymerization systems.

Acrylonitrile is commonly polymerized in aqueous solution in the presence of a perdisulfate catalyst and a bisulfite activator from which solution the polymer precipitates in finely divided form. This method generally insures the production of a polymer of high degree of purity and of relatively high, uniform molecular weight which makes for optimum fiber properties. Up to the present, it has been commonly thought that in the continuous polymerization of acrylonitrile the concentration of monomer in the total feed of reactants should not exceed the solubility of acrylonitrile in water so that the concentration of monomer in the resultant slurry would be well below this point to insure a homogeneous solution polymerization. It was also assumed that the important factors controlling conversion of monomer to polymer in a continuous system were variables other than monomer concentration. Up to this time, using a given concentration of monomer, it was not possible to increase the production rate of a given continuous reactor appreciably without changing the characteristics of the polymer formed. The only known method of increasing conversion was to increase the concentrations of the redox catalyst system. This always resulted in increased yield of polymer, but the molecular weight of the polymer formed was inversely proportional to the yield. Thus, in order to operate within polymer specifications, a given concentration of reactants was necessary, and the production in existing polymerization equipment was relatively limited.

It is an object of this invention to provide an improved process for continuous aqueous solution polymerization and/or copolymerization of acrylonitrile that greatly increases productivity while maintaining high quality and high uniform molecular weight. Other objects will be apparent from the description that follows.

The objects of this invention are accomplished by carrying out the polymerizations at a substantially constant pH between about 2.5 and about 3.5 and at increased concentrations of acrylonitrile monomer and reduced concentrations of the catalyst and activator. By changing these concentrations, as indicated, from those normally used, yields as high as 95% are obtained while the polymer produced is of the same high average molecular weight as before and of good quality as reflected by less color and by other physical and chemical tests. The increase in monomer feed rate over that commonly used may be of the order of 2 or more times and the concentrations of catalyst and activator may be reduced to about half that commonly used while maintaining the catalyst/activator ratio substantially constant. Production may be increased from two to three-fold because of these simple changes without introducing any adverse effects.

More precisely stated the invention comprises controlling polymer preparation in continuous aqueous solution polymerization by altering the concentration of the redox catalyst in accordance with the molecular weight of polymer desired and the rate of acrylonitrile monomer feed.

The desired results are obtained by maintaining the catalyst concentration within about 10%, in either direction, of the value calculated by means of the following empirical formula:

$$\% \text{ Cat.} = \left(0.77 \times \log \frac{55}{\%M}\right) + \left(0.8 \times \log \frac{4.00}{[\eta]^2}\right)$$

where "% Cat." is the percent concentration of catalyst fed into the reactor based on the amount of monomer simultaneously being fed thereto; where "% M" is the percent of monomer, either entirely acrylonitrile or the total of the acrylonitrile and copolymerizable monomer, of the total feed and where "$\eta$" is the desired intrinsic viscosity of the polymer. Percentages and parts herein are by weight.

The figure shows graphically how one can use the formula. Given the intrinsic viscosity desired and monomer concentration to be used, the amount of catalyst is readily calculated. The amount of activator used is generally about 1.7 times the amount of catalyst, although this may vary somewhat say from about 1.5 to 2.0 times the amount of catalyst. The solid lines 2, 3, 4 and 5 in the figure indicate experimental results obtained at the specified intrinsic viscosities. The dash lines, 6, 7, 8 and 9 indicate the values as calculated by the formula. The shaded areas 10, 11, 12 and 13 indicate permissible variations of 10% in either direction in which area the benefits of the process of this invention are still attained.

Improved results are obtained when the acrylonitrile monomer feed is increased only slightly, i. e., from the normal 13.5% to 16%. These percentages are based on the total weight of the feed, that is, the total weight of water, monomer, catalyst, acid, etc. Especially desirable results are obtained when the acrylonitrile monomer feed is increased to 20% and above as for instance to 30% or even 40% or more. Normally, the concentration of the catalyst will be about 0.5% to about 0.2% and the activator concentration will be about 1.0% to about 0.3% based on the weight of the monomeric material. The lower concentrations of catalyst and activator are used with the higher concentrations of the monomeric material and vice versa.

Illustrative results obtained from a series of continuous aqueous solution polymerization runs of acrylonitrile homopolymer all of 1.8 intrinsic viscosity are shown in Table I below.

TABLE I

Single-stage reactor

| Monomer Conc. Fed | Cat. (based on Monomer Fed), Percent | Act. (based on Monomer Fed), Percent | Conv., Percent | Increase in Prod., Percent |
|---|---|---|---|---|
| 13.5 | 0.592 | 1.00 | 70 | 0 |
| 16 | 0.475 | 0.80 | 75 | 38 |
| 20 | 0.395 | 0.67 | 81 | 72 |
| 30 | 0.300 | 0.50 | 86 | 173 |

The method of this invention is not only adaptable to a single stage reactor to give additional increases in conversion over those normally obtained but can be adapted to a multistage reactor to increase yields still further.

TABLE II

Multistage reactor (2-stages) 1.40 int. visc.

| Monomer Conc. Fed, Percent | Cat. Conc. | Act. Conc. | Conv. 1st Stage, Percent | Conv. 2nd Stage, Percent | [$\eta$] |
|---|---|---|---|---|---|
| 13.5 | 0.592 | 1.00 | 70 | 78 | 1.23 |
| 20 | 0.356 | 0.600 | 79 | 88 | 1.61 |

As can be seen from these values, the conversion is increased and the intrinsic viscosity is kept at the desirable, higher level by using the larger concentration of acrylonitrile and the lower concentrations of the catalyst and activator. If the concentration of monomer is increased and the concentration of the redox catalytic system relative to the monomer is unchanged, increased conversions result but only with the production of polymers of unsatisfactory, lower intrinsic viscosities.

The following examples are given below to further illustrate the invention. In the examples above and below the pH is kept substantially constant at a value between 3.0 and 3.5.

EXAMPLE I

Using a continuous stirred reactor having a capacity to hold 1600 ml. of reaction mixture, the following materials were metered into the reactor simultaneously to give a 13.5 per cent feed of monomer based on total feed.

| Reactant | Rate of Metering, g./hr. |
|---|---|
| Acrylonitrile monomer | 216 |
| 0.18% $H_2O$ soln. of $K_2S_2O_8$ | 692 |
| 0.31% $H_2O$ soln. of $Na_2S_2O_5$ | 692 |
| 2N $H_2SO_4$ | 2.5 |

The reactor was thermostated at 52° C. and a blanket of nitrogen maintained over the reactants by bleeding into the reactor a steady stream of gas. At "steady state" the conversion of monomer to polymer was 67 percent based on the flows of reactants. The polymer prepared in this manner had an intrinsic viscosity of 1.8 and was considered to be control polymer as it did not differ measurably in its characteristics from normal production polymer. The color of the yarn expected from this polymer is measured from the color of a 5 percent solution of the polymer in dimethylformamide; this color index number was 28. Using a Fischer electrophotometer the color index is the average of 100 times the optical density at 425, 525 and 650$\mu\mu$ filters on a transparent 5% solution of polyacrylonitrile in dimethylformamide which has been heated 1 hour at 125° C. The following results are given as representative of the normal polymerization and as a control for comparison.

EXAMPLE II

Using the continuous stirred reactor of Example I, the following solutions were metered in simultaneously to give a 16 per cent feed of acrylonitrile based on total feed.

| Reactant | Rate of Metering, g./hr. |
|---|---|
| Acrylonitrile monomer | 256 |
| 0.18% $H_2O$ soln. of $K_2S_2O_8$ | 672 |
| 0.31% $H_2O$ soln. of $Na_2S_2O_5$ | 672 |
| 2N $H_2SO_4$ | 2.5 |

Under steady state conditions, the conversion of monomer to polymer was increased to 75 percent. This polymer had an intrinsic viscosity of 1.8 and was comparable to the polymer of Example I with the advantage that the color was improved (color index 20). The catalyst and activator feed was reduced about 3% from that of Example I while the monomer feed rate was increased about 18%.

EXAMPLE III

Using the continuous stirred reactor of Example I, the following solutions were metered in simultaneously to give a 16 percent feed of acrylonitrile based on total feed.

| Reactant | Rate of Metering, g./hr. |
|---|---|
| Acrylonitrile monomer | 256 |
| 0.23% $H_2O$ soln. of $K_2S_2O_8$ | 672 |
| 0.38% $H_2O$ soln. of $Na_2S_2O_5$ | 672 |
| 2N $H_2SO_4$ | 2.5 |

Under steady state conditions a conversion of 77 per cent of monomer to polymer was obtained. This polymer had an intrinsic viscosity of 1.5 and did not differ in other measurable characteristics from polymer of Example I except that the color was improved (color index 20). The catalyst and activator feed was increased about 28% and 22% respectively over that of Example II thus giving a lower viscosity polymer.

EXAMPLE IV

Using the continuous stirred reactor of Example I, the following solutions were metered in simultaneously to give a 20 percent feed of acrylonitrile based on total feed.

| Reactant | Rate of Metering, g./hr. |
|---|---|
| Acrylonitrile monomer | 320 |
| 0.20% $H_2O$ soln. of $K_2S_2O_8$ | 640 |
| 0.31% $H_2O$ soln. $Na_2S_2O_5$ | 640 |
| 2N $H_2SO_4$ | 2.5 |

Under steady state conditions a conversion of 82 per cent of monomer to polymer was obtained. This polymer had an intrinsic viscosity of 1.8 and did not differ in other measurable characteristics from polymer of Example I except that the color was improved (color index 15). Here the ratio of catalyst to monomer in the feed was reduced nearly 30% as compared to Example I.

EXAMPLE V

Using a continuous stirred reactor having a reactant volume of 1600 ml., the following reactants were metered into the reactor simultaneously to give a 13.5 per cent feed of monomer based on total feed.

| Reactant | Rate of Metering, g./hr. |
|---|---|
| 94% Acrylonitrile/6% methyl acrylate | 256 |
| 0.18% $H_2O$ soln. of $K_2S_2O_8$ | 672 |
| 0.31% $H_2O$ soln. of $Na_2S_2O_5$ | 672 |
| 2N $H_2SO_4$ | 2.5 |

Under steady state conditions, a conversion of 70 per cent of monomer to polymer was obtained. This polymer had an intrinsic viscosity of 1.7.

EXAMPLE VI

Using a continuous stirred reactor of Example I, the following solutions were metered in simultaneously to give a 25 per cent feed of monomer based on total feed.

| Reactant | Rate of Metering, g./hr. |
|---|---|
| 94% Acrylonitrile/6% methyl acrylate | 400 |
| 0.25% $H_2O$ Soln. of $K_2S_2O_8$ | 600 |
| 0.50% $H_2O$ Soln. of $Na_2S_2O_5$ | 600 |
| 2N $H_2SO_4$ | 2.5 |

Under steady state conditions a conversion of 84 per cent of monomer to polymer was obtained. This polymer had an intrinsic viscosity of 1.6 and did not differ in other measurable characteristics from polymer of Example V above.

The polymerizations of this invention are solution polymerizations occurring in aqueous systems using a perdisulfate catalyst and an activator comprising a water-soluble sulfoxy reducing agent which has a sulfur atom having a valence not exceeding four. These materials are well described in the art, as, for example, in the patents cited herein. The pH of the system used in this invention is between 2.5 and 3.5 and is kept substantially constant during the polymerization. The pH is maintained by the addition of a neutralizer, such as an acid or base, depending upon the conditions. These and other conditions are set forth in Richards patent U. S. No. 2,628,223. By the process of the present invention, through increasing the concentration of the monomer in the reactant feed streams and suitably lowering the catalyst and activator concentrations relative to the monomer, conversions are increased to about 90% or more. Capacity is increased up to 250% and monomer recovery costs are decreased. The quality of the polymer is improved in most instances.

This invention not only enables production to be markedly increased but at the same time the quality of the polymer is improved as evidenced by a lowering of the color index. Any desired intrinsic viscosity or polymer molecular weight obtainable by previous methods may be made by this method. The process of this invention may be carried out in the same equipment used heretofore without any alteration thereof, and the process is applicable to either a single or a multistage continuous polymerization system. Where preferred conditions of monomer feed concentration are used, i. e., monomer feed rates in the range of from 20 to 40% of the total feed, a polymer much improved in whiteness is obtained.

The invention is equally applicable to the production of homopolymers of acrylonitrile or the manufacture of copolymers wherein the acrylonitrile component is at least 85% by weight. Any of the copolymerizing compounds mentioned in the prior art may be used here with acrylonitrile to form a two component copolymer or in various combinations of 2 or 3 or more copolymerizing ingredients so long as at least 85% of the polymer results from acrylonitrile. The copolymerizable monomers may be mono-, di- or polyethylenically unsaturated compounds and include such compounds as the vinyl pyridines, methyl vinyl ketone, butadiene, styrene, the acrylates, the methacrylates, and other comonomers shown in such patents as U. S. 2,404,713 to 2,404,727.

By varying the monomer concentration over a wide range, a uniform polymer not differing appreciably in any measurable property over a wide range of conversion can be prepared, thereby greatly improving the capacity of the reactor. Monomer may be added to the aqueous reaction medium at a rate several times that used heretofore and the polymerization still takes place in the aqueous solution phase. Not only is productivity greatly increased, but surprisingly the polymer quality is excellent and the same desired high, uniform molecular weights result in spite of carrying the reaction to 90% or more completion. Additionally, the color of the polymer is markedly improved.

Any departure which conforms to the principles of this invention is intended to be included within the scope of the claims below.

We claim:

1. Process of converting ethylenically unsaturated monomeric material in aqueous medium having pH from about 2½ to about 3½ into polymeric material (having intrinsic viscosity $\eta$) containing in the polymer molecule at least 85% acrylonitrile by weight, in continuous manner, comprising feeding together ethylenically unsaturated monomeric material of at least about 85% acrylonitrile, acidic aqueous liquor sufficient to maintain the indicated acidity, and catalyst and activator members of a redox catalytic system in which the amount of activator by weight is from 1½ to 2 times as much as the amount of catalyst and the ratio of catalyst amount to the amount of monomeric material in the feed is equivalent in per cent by weight to about $$0.77 \log \frac{55}{\% M} + 0.8 \log \frac{4}{\eta^2}$$

where "%M" is the percentage of monomeric material by weight in the feed and is at least 16, whereby at least 75% of the monomeric material so fed is converted to the corresponding indicated polymeric material.

2. A process in accordance with claim 1 wherein the concentration of said catalyst is from about 0.5% to about 0.2%, based on the weight of said monomeric material.

3. A process in accordance with claim 1 wherein the concentration of said catalyst is from about 0.5% to about 0.2% and the concentration of said activator is about 1.0% to about 0.3%, said concentrations being based on the weight of said monomeric material.

4. A process in accordance with claim 1 in which the catalyst of the redox system is a perdisulfate and the activator is a water-soluble sulfoxy reducing agent containing a sulfur atom having valence of at most 4.

5. A process in accordance with claim 1 in which the resultant polymeric material is essentially polyacrylonitrile.

6. A process in accordance with claim 1 in which the various starting materials are fed into, and the resulting materials are removed from, a polymerization system whose volume approximates the hourly flow of materials into and out of it.

References Cited in the file of this patent

UNITED STATES PATENTS

| | | |
|---|---|---|
| 2,374,841 | Semon | May 1, 1945 |
| 2,473,549 | Smith | June 21, 1949 |
| 2,486,241 | Arnold | Oct. 25, 1949 |